United States Patent
Ambrosi et al.

(10) Patent No.: US 7,265,359 B2
(45) Date of Patent: Sep. 4, 2007

(54) METHOD AND DEVICE FOR DETECTING FAST NEUTRONS

(75) Inventors: Richard Malick Ambrosi, Loughborough (GB); George William Fraser, Melbourne (GB)

(73) Assignee: University of Leicester, Leicestershire (GB)

( * ) Notice: Subject to any disclaimer, the term of this patent is extended or adjusted under 35 U.S.C. 154(b) by 0 days.

(21) Appl. No.: 10/526,823

(22) PCT Filed: Sep. 8, 2003

(86) PCT No.: PCT/GB03/03906

§ 371 (c)(1),
(2), (4) Date: Aug. 8, 2005

(87) PCT Pub. No.: WO2004/023161

PCT Pub. Date: Mar. 18, 2004

(65) Prior Publication Data

US 2006/0163487 A1 Jul. 27, 2006

(30) Foreign Application Priority Data

Sep. 7, 2002 (GB) .................................. 0220812.2

(51) Int. Cl.
*G01T 3/00* (2006.01)
(52) U.S. Cl. ............................................. 250/390.01
(58) Field of Classification Search ........... 250/390.01, 250/390.12
See application file for complete search history.

(56) References Cited

U.S. PATENT DOCUMENTS 6,045,677 A 4/2000 Beetz, Jr. et al.
6,828,714 B2 * 12/2004 Downing et al. .... 313/103 CM

FOREIGN PATENT DOCUMENTS

| DE | 004237097 A1 * | 5/1993 |
| FR | 2.053.599 | 4/1971 |
| GB | 1455011 | 10/1976 |
| JP | 62174679 A | 7/1987 |

OTHER PUBLICATIONS

Ambrosi, Richard M., et al., "Physics of Image Formation in Accelerator-based Fast Neutron Radiography," SPIE vol. 4142, (2000), pp. 331-344.
Feller, W.B., et al., "Neutron field imaging with microchannel plates," SPIE vol. 4141 (2000), pp. 291-302.
Fraser, G. W., et al., "The Direct Detection Of Thermal Neutrons By Imaging Microchannel-Plate Detectors," Nuclear Instruments & Methods in Physics Research (1990), pp. 569-574. vol. A293.

(Continued)

Primary Examiner—Constantine Hannaher
(74) Attorney, Agent, or Firm—McDermott Will & Emery LLP (57) ABSTRACT

A method of detecting fast neutrons of energy greater than 5 MeV is provided. The method includes providing a neutron detector including a plate having plurality of detection sites disposed thereon which produce an electron output. The neutron detector is directly coupled to an electron detector without an intermediate scintillator layer. The detector is positioned so that neutrons are incident on the detector and the output of the electron detector is detected.

18 Claims, 9 Drawing Sheets

OTHER PUBLICATIONS

Street, Robert A. et al., "*X-ray imaging using lead iodide as a semiconductor detector*," SPIE vol. 3659 (Feb. 1999), pp. 36-47.

Downing, R.G., et al., "*High Spatial-Resolution Imaging of Low Energy Neutrons with MicroChannel Plates*," Transactions of the American Nuclear Society, vol. 82, (Jun. 4-8, 2000), pp. 83-84.

* cited by examiner

- ■ Silicon MCP (90% Si + 5% H)
- ○ Silicon MCP (90% Si)
- △ Silica Glass (45% Si)
- ✱ Silica Glass (20% Si)

METHOD AND DEVICE FOR DETECTING FAST NEUTRONS

This Application is a U.S. National filing under §371 of International Application No. PCT/GB2003/003906, filed 8 Sep. 2003, claiming priority from British Appln. No. 0220812.2, filed 7 Sep. 2002, now pending (which is hereby incorporated by reference).

This invention relates to detector devices, their use in detecting neutrons and to methods for detecting neutrons, with particular, but by no means exclusive, reference to fast neutrons of energy greater than 5.0 MeV.

Neutrons interact with the nucleus of an atom. Unlike X-rays, which interact with the electrons of an atom and thus are sensitive to the density of a material, neutrons are able to penetrate high density materials. This is a result of the nature of the interaction and of the low neutron scattering cross sections associated with high density materials. In contrast to X-rays, low density materials are more opaque to neutrons.

Thermal neutron radiography is currently routinely used as a non destructive testing and imaging method with many end applications. In contrast, fast neutron radiography is not a commonly used technique. This is despite numerous potential attractions to the use of fast neutron radiography. These attractions include the non destructive nature of the method, the penetrability of fast neutrons through high density materials, and the possibility of element sensitive imaging through resonance radiography (if the neutron energy matches a resonance corresponding to a specific element, the neutron flux scattered by that element will be relatively greater than that produced by the surrounding medium, thus enhancing the contrast of that element relative to the background). A further consequence of the high penetrating power of high energy neutrons is that large objects can be probed. There are a variety of industrial applications which fast neutron radiography might be employed in, such as contraband, narcotics and explosives detection, and cargo inspection.

Commonly used position sensitive detectors for fast neutron radiography utilise charge coupled devices (CCDs) and scintillators as imaging tools. There are problems associated with both of these detection elements. The most widely used methods for fast neutron detection currently depend on the elastic scattering of protons and the subsequent conversion of the proton energy into a number of electrons. In turn these are often converted into light by means of a scintillator material. Transduction of this light into an electrical signal is accomplished using a CCD.

The cross-section for the scattering of protons is very much lower than that for the absorption reactions $^7Li(n,\alpha)$ or $^{10}B(n,\alpha)$ which are used for detection in thermal neutron radiography (see below). The total cross-section for neutron scattering in hydrogen as a function of energy drops rapidly with energy from about 11 barns at 150 keV to about 1 barn at 10 MeV. In spite of this it is larger than the cross-section for most other reactions that could be considered.

The primary efficiency of the scintillator detector can be defined as the ratio of the total number of neutrons that interact with the screen, to the number of neutrons that are incident on it. Defined in this way the primary efficiency $\epsilon_p$ is:

$$\epsilon_p = (1 - \exp^{-N\sigma d})$$

where N is the density of hydrogen atoms, σ is the cross section and d is the thickness of the screen.

In the case of a converter in the form of a slab, the maximum thickness is limited by the range of spreading of light within the screen and its effect on the resolution and the transparency of the detector to its own light. Polyethylene, which has two hydrogen atoms for each carbon atom, is the most efficient, but it has the disadvantage of not being transparent when a scintillator is used (although it is translucent). Polypropylene is transparent although its primary efficiency is some 17% lower than for polyethylene.

A particularly effective form of scintillator is a block of polypropylene containing ZnS as the scintillator. ZnS has several advantages including a very high light output for heavy charged particles, such as protons, and a low sensitivity for electrons. This detector is commercially available as the "PP Converter". This converter is opaque to its own light and its thickness is limited to 2 mm with an efficiency of about 2%. All thick scintillators suffer from the problem of light spreading due to scattering within the body of the converter.

Thus, the efficiency of hydrogen rich scintillators exploiting the proton recoil reaction to indirectly detect the neutrons are limited by their concentration of hydrogen and neutron scattering cross section. Furthermore, the light conversion step limits the thickness of the scintillators, which in turn influences light spreading, light scattering and image blurring.

There are further disadvantages associated with the use of CCDs. The physical limitation imposed by the sizes of the CCDs implies that complex optical systems involving lenses and optical fibre tapers are required to image areas that are larger than 8.6 cm×11.05 cm, which is the size of the largest optical CCD produced. Using optics in the imaging process reduces the light collection efficiency of the imaging system primarily as a result of the demagnification process required to reduce the image size to that of a CCD. Often, image intensifiers have to be used to boost the photon signal emerging from the optics of the detector system. Since crystalline silicon is prone to radiation damage, the CCD is often placed outside of the primary neutron beam. As a result, the light from the scintillator has to be reflected through the optics of the camera by suitable mirror. The use of a lens represents another component in the optical system which results in further light losses.

Ambrosi et al (R. M. Ambrosi, J. I. W. Watterson and H. Rahmanian, Proc. SPIE 4142 (2000) 331) describe fast neutron radiography using scintillators in combination with i) CCDs and ii) an amorphous silicon (a-Si) sensor array. Although the amorphous silicon sensor array does not suffer from some of the disadvantages associated with CCDs, the above described problems with the use of scintillators remain. The contents of Ambrosi et al are herein incorporated by reference.

As noted above, thermal neutron radiography is used currently as a non destructive testing and imaging method. Of particular relevance to the present invention is the recent demonstration that microchannel plate (MCP) detectors are capable of imaging cold and thermal neutrons (W. B. Feller, R. G. Downing, and P. L. White, "Neutron Field Imaging with Microchannel Plates", Proc SPIE 4141 (2000) 291, and R. G. Downing et al., "High Resolution Imaging of Low-Energy Neutrons with Microchannel Plates", Trans. Amer. Nucl. Soc., 82 (2000) 83). The key to the detection process is the use of specially prepared, boron enriched MCPs, an approach that was originally predicted by Fraser and Pearson at the University of Leicester (G. W. Fraser and J. F.

Pearson, "The Direct Detection of Thermal Neutrons by Imaging Microchannel Plate Detectors", Nucl. Instr. Meth. A293 (1990) 569).

To register an MCP output charge with a high degree of spatial resolution, a number of current MCP based imaging systems are known which include scintillator screen systems and compatible pulse counting electronic readouts. The latter type of system has not been utilised for neutron detection with MCPs. The electronic readout systems can be categorised into two classes:

(1) Discrete wire anodes, which digitise event positions based on wire group selection (MAMA, cross grid charge detector, codacon).
(2) Continuous centroid position encoders (eg, resistive anode encoder (RAE), delay line, wedge and strip, etc.), which digitise x-y coordinates in the associated electronics.

Discrete wire readout type anodes suffer from a number of disadvantages, such as limited size, Moire effects, and image undersampling. Centroiding readouts overcome these disadvantages and offer large format high resolution MCP imaging systems. Crucially, however, neither readout class offers the key combination of very large formats for radiography at reasonable cost.

From the foregoing, it will be apparent that there is a need for an improved detection system for neutrons, particularly fast neutrons (of energy greater than 5 MeV), and even more particularly for an imaging system for fast neutrons. More specifically, there is a need for position-sensitive neutron detectors that have a combination of high sensitivity, high spatial resolution or imaging power, whilst simultaneously minimising interference from low energy scattered neutrons and background radiation such as gamma rays. Furthermore, there is a need for improved MCP detector devices which are capable of a high degree of spatial resolution. Such detector devices would not be limited to the detection of neutrons per se.

The present invention overcomes the aforementioned problems and disadvantages of the prior art, and satisfies the above described needs.

According to a first aspect of the invention, there is provided a method of detecting-fast neutrons of energy greater than 5 MeV comprising the steps of:

providing a neutron detector comprising a plate detector having a plurality of microchannel detection sites disposed thereon which produce an electron output;

directly coupling said neutron detector to an electron detector without an intermediate scintillator layer;

positioning the neutron detector so that neutrons are incident on said neutron detector; and detecting the output of the electron detector.

In this way, the aforementioned problems and disadvantages are overcome, and the aforementioned needs are satisfied. The present invention offers numerous advantages, such as high sensitivity, submillimetre resolution, minimal interference from low energy scattered neutrons (which would cause blurring), and minimal interference from background radiation such as gamma rays. Additionally, the detector device used to detect neutrons has the advantage of being radiation hard. Additionally still, the present invention enables large format detectors to be used conveniently for neutron detection. In contrast to prior art techniques which utilise scintillators, the present invention does not utilise a light conversion step, and hence resolution and contrast are not affected by light spreading and light scattering. Fast neutrons of energy greater than 5 MeV are detected. By doing so, the present invention can take advantage of the high penetrability of such neutrons. The present invention provides an understanding of the physical mechanisms involved in enabling MCPs to detect neutrons of such high energy, and exploits these physical mechanisms. In particular, the present invention exploits neutron interaction with elemental silicon in the MCP. It is advantageous that silicon can be used as the active element for the detection of fast neutrons, since silicon is inherently present in conventional MCP structures. This can be contrasted with the boron enriched MCPs utilised to detect thermal neutrons: boron is not a constituent of conventional MCPs, and therefore special procedures and additional expense are required to introduce it into MCPs.

The neutron detector may be a MCP, although similar detectors, such as microsphere plates (MSPs) and microfibre plates (MFPs) might be used. Such devices utilise the same general principle of electron multiplication as MCPs, only instead of channels the electrons are multiplied by interaction with small spheres or randomly arranged fibres having diameters of the same order as those of a MCP channel and of essentially identical composition.

The area of the neutron detector upon which the detected neutrons are incident may be greater than $1.0 \times 10^{-2}$ m$^2$, preferably greater than $5.0 \times 10^{-2}$ m$^2$, more preferably greater than $5.0 \times 10^{-1}$ m$^2$, most preferably greater than $6.0 \times 10^{-1}$ m$^2$.

Preferably, the electron detector is without an entrance window, thereby permitting direct accumulation of electron charge from the neutron detector on the electron detector.

The electron detector may comprise a pixel array detector. The electron detector may comprise an amorphous silicon, polysilicon or an amorphous selenium pixel array detector. Such detectors are position sensitive, and are particularly well suited to use with MCPs, and exhibit noise levels of at least ~800 electrons per pixel rms (root mean square). The MCP charge multiplication process increases the signal to noise so that it is comparable to a CCD based system incorporating an image intensifier. Additionally, these detectors are available in large formats at reasonable cost, and are well suited to imaging applications. For the avoidance of doubt TFT (thin film transistor) arrays, such as a-Si diode-TFT and polysilicon diode-TFT arrays are examples of pixel arrays.

The neutron detector may comprise greater than 45% by weight of silicon, preferably greater than 90%. By enhancing the amount of silicon present, the neutron detection efficiency is enhanced. Another way of enhancing neutron detection efficiency is to provide MCPs of relatively large thickness. MCP thicknesses of greater than 5 mm, or even greater than 10 nm, may be used.

In a preferred embodiment neutrons are imaged by the method, in which instance the step of detecting the output of the electron detector comprises assembling outputs from different discrete areas of the electron detector in order to produce an image of neutrons incident on said neutron detector. In this way, a number of imaging applications, such as cargo inspection and contraband, narcotics, explosives detection, and mining may be realised. Imaging of fast neutrons is particularly preferred. It should be noted that to probe large objects containing high Z materials the only option available is fast neutron radiography The neutron detector may comprise an array of individual neutron devices. The array may comprise a stacking of MCPs (in order to increase the overall thickness of the MCP stage) and/or a tile of MCPs (in order to provide a detector having a MCP stage of increased surface area).

According to a second aspect of the invention there is provided a detection device for detecting radiation such as neutrons and X-rays comprising a radiation detector directly coupled to a pixel array electron detector, in which the radiation detector comprises a plate having a plurality of microchannels or like detection sites disposed thereon which produce an electron output, and the radiation detector is directly coupled to the electron detector without an intermediate scintillator layer. In addition to detecting (and imaging) neutrons, such devices can be used in X-ray imaging and neutron focusing applications.

The radiation detector may be a microchannel, microsphere or microfibre plate.

The electron detector may be an amorphous silicon or amorphous selenium pixel array detector.

The electron detector may be without an entrance window thereby permitting direct accumulation of electron charge from the radiation detector on the electron detector.

The radiation detector may have a front face upon which radiation is incident, and the surface area of said front face may be greater than $1.0 \times 10^{-2}$ m$^2$, preferably greater than $5 \times 10^{-2}$ m$^2$, more preferably greater than $5.0 \times 10^{-1}$ m$^2$, most preferably greater than $6.0 \times 10^{-1}$ m$^2$.

The device may image radiation (such as neutrons and X-rays), the device further comprising imaging means for assembling outputs from different discrete areas of the electron detector in order to produce an image of radiation incident on said radiation detector.

The device may comprise a circuit board in electrical connection with the electron detector, and a vacuum seal made against the circuit board. The circuit board may be a printed circuit board.

According to a third aspect of the invention there is provided the use of a device according to the second aspect of the invention to image neutrons.

Fast neutrons of energy greater than 5 MeV may be imaged.

According to a fourth aspect of the invention there is provided the use in the imaging of fast neutrons of energy greater than 5 MeV of a device comprising a neutron detector directly coupled to an electron detector without an intermediate scintillator layer, the neutron detector comprising a plate having a plurality of microchannel or like detection sites disposed thereon which produce an electron output.

Devices, methods and uses in accordance with the invention will now be described with reference to the accompanying drawings, in which:

FIG. 1 shows a) a perspective view and b) a cross sectional view of a first embodiment of a device according to the invention;

Figure 1A:
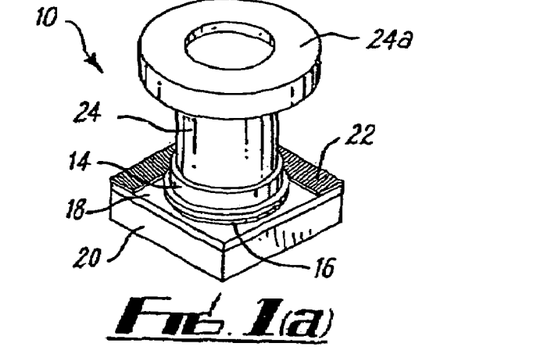
Figure 1B:
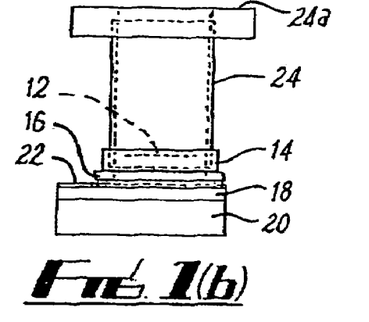
Figure 2:
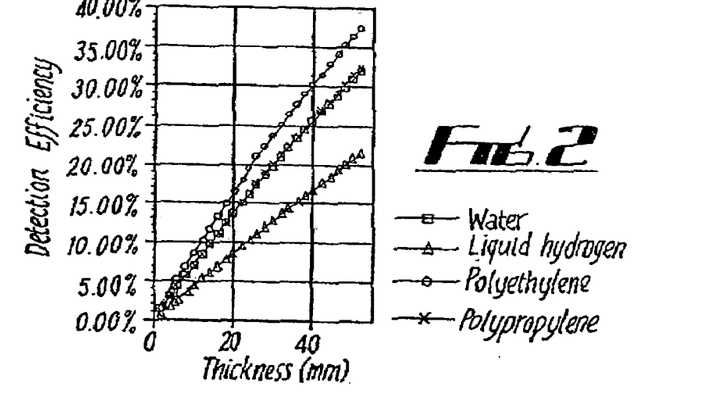
FIG. 2 shows primary efficiency for neutron detection for candidate materials for neutron screens in fast neutron radiography, calculated for 8 MeV neutrons (total cross section 1.1 barns) as a function of the converter thickness.

FIG. 1 shows a first embodiment of a device of the present invention. The device, generally shown at 10, comprises a MCP 12 disposed in a vacuum vessel 14. One end of the vacuum vessel 14 is sealed via an O-ring 16 to an electron detector, such as an amorphous silicon (a-Si) readout array 18. There is no scintillator layer intermediate the MCP 12 and readout array 18, and thus a direct coupling is established, without a light conversion step. The vacuum vessel 14 is sealed to the glass substrate of the amorphous silicon readout array 18. The anode of the readout array 18 is in connection with a support substrate 20. A bonding agent such as an epoxy resin may be used to effect this connection. Electrical contacts 22 are provided, which enable the output of the readout array 18 to be measured, and appropriate voltages to be applied to the MCP 12 and readout array 18. The vacuum vessel 14 is in connection with a vacuum tube 24, which has a vacuum flange 24a permitting connection of the device 10 to a vacuum system (not shown). The vacuum system can house a source of neutrons, and/or be used to transmit neutrons from a neutron source to the detector device 10. Additionally, the vacuum system might house an object which is to be imaged by the device 10. It will be apparent to those skilled in the art that there are numerous ways in which the neutron source and an object to be imaged might be disposed with respect to the device 10.

An appealing aspect of the present invention is the use of a MCP. One advantage is that MCPs provide an amplification effect due to the electron avalanche which is created in the microchannels during detection. Another advantage is that MCPs offer the possibility of high spatial resolution—limited, essentially, by the size of the microchannels. However, it must be emphasised that these potential benefits can only be realised if the MCP is suitably coupled to an appropriate detection system which is capable of detecting electrons produced by the MCP without significantly degrading performance.

The neutron detection system provided by the present invention employs a MCP detector as the neutron converter and an electron detector as the readout for the microchannel plate converter. Interactions between the neutrons and certain elements in the MCP (described in more detail below) are used in the neutron detection process in the microchannel plate converter. The nuclear interactions produce charged particles which ionise the MCP material and generate electrons which in turn interact with the walls of the channels in the MCP. A potential applied across the MCP results in the multiplication of the charge generated by the initial neutron interaction. The total charge output of each channel is read out by the electron detector. The imaging process does not require a light conversion step, a characteristic of current scintillator based fast neutron imaging methods, and hence the resolution and contrast of the imaging process is not affected by light spreading and light scattering.

A further advantage of the present invention is that the use of large format detection systems is readily accommodated: indeed, such large format systems are preferred embodiments of the present invention, since imaging of relatively large objects can be accomplished without the disadvantage encountered with the scintillator-CCD prior art detection systems of having to employ image reduction optics. It is preferred that the area of the MCP (or the combined area of the MCPs if more than one MCP is used in the "front face" of the detector) is greater than $1.0 \times 10^{-2}$ m$^2$, more preferably greater than $5.0 \times 10^{-2}$ m$^2$, and most preferably greater than $5.0 \times 10^{-1}$ m$^2$. In fact, MCP areas as large as 1 m$^2$ or greater might be used. The active area of the electron detector would, of course, generally be commensurate with the area of the MCP. Thus, it is preferred that the electron detector has an electron detecting face of surface area greater than $1.0 \times 10^{-2}$ m$^2$, more preferably greater than $5.0 \times 10^{-2}$ m$^2$, most preferably greater than $5.0 \times 10^{-1}$ m$^2$.

A preferred form of election detector is a pixel array detector. Such detectors possess an array of pixel diode detectors. In some devices, each pixel has readout electronics. In other devices, a row of the array is addressed at a time, and the readout electronics are at the end of each column. Such detectors are readily available in large format form and exhibit low noise. A particularly preferred form of pixel array detectors comprise amorphous semiconductor devices, such as amorphous silicon or amorphous selenium detectors. Amorphous silicon pixel array detectors are in active commercial production (for example, by Varian Imaging Products, Palo Alto, Calif., USA) for medical radiography, high energy physics and other fields, although the combination of such devices with MCPs as proposed herein has not previously been described. Typically, a matrix of, for example, 127×127 µm square and 30 micron thick diodes is read out by an array of thin-film transistors (TFTs). Another feature of the present invention is the approach employed to digitally read out the potentially large format MCPs. This approach employs large area, relatively low noise amorphous silicon imaging arrays. These arrays are typically fabricated in the form of rows of individual photodiode sites attached to a common readout line per row. The individual pixels are switched onto the readout line through rows of thin film transistors which are gated via common columnar contacts. The result is an array of charge sites each with its own individual readout path to an external amplifier and digitiser. Further details of amorphous silicon pixel arrays can be found in Ambrosi et al, ibid; R. A. Street, Technology and Applications of Amorphous Silicon, Ed. R. A. Street, Springer Series in Materials Science 37, Springer-Verlag, Berlin (2000) 147; R. Street et al, Proc. SPIE 3659 (1999) 36; R. Street et al, Proc. SPIE 3977 (2000) 418. Large arrays (eg, 200 mm×250 mm, or even 400 mm×300 mm) of this basic design are increasingly available for commercial markets such as medical radiography. In operation, charge pulses emitted from the MCP output accumulate on the diodes, and subsequently would be read out as described above. The spatial resolution of current amorphous silicon detectors only is slightly inferior to the spatial resolution theoretically possible with standard MCPs, and so a slight degradation in spatial resolution may be expected. Amorphous silicon detectors having smaller pixel sizes are currently under development, and it is likely that such devices will become available in the future. The use of such devices would result in further improvement in spatial resolution. However, the pixel size of current a-Si detectors (~100 µm) is such that, when such detectors are incorporated into devices of the present invention, the device resolution affords an order of magnitude improvement over prior art fast neutron imaging systems. It should be noted that detector devices such as amorphous silicon detectors usually possess an entrance window which, in the present invention, incident electrons from the MCP must penetrate, thereby degrading gain somewhat. It is possible that the electron detector is coupled to the MCP without an intermediate entrance window. In this way, electron charge from the MCP directly accumulates on the electron detector. In the case of the amorphous silicon detector, electron charge accumulates on the plates of the diodes.

An important aspect of the present invention is the detection and imaging of fast neutrons, ie, neutrons of energy greater than 5.0 MeV. The present invention exploits an understanding of the fundamental physics of the interaction of fast neutrons with materials. As discussed previously, cold and thermal neutrons (of energy less than 1 eV) can be detected using specially boron enriched MCPs. The present invention recognises that elemental silicon (already present in conventional MCP alkali lead silicate glass) can be used as the active neutron converter for fast neutrons, by way of exploiting the $^{28}$Si(n,p)$^{28}$Al, $^{28}$Si(n,α)$^{25}$Mg, $^{28}$Si(n,d)$^{27}$Al and $^{28}$Si(n,np)$^{27}$Al conversion reactions. These reactions result in the production of an electron pulse within the MCP structure.

Figure 3:
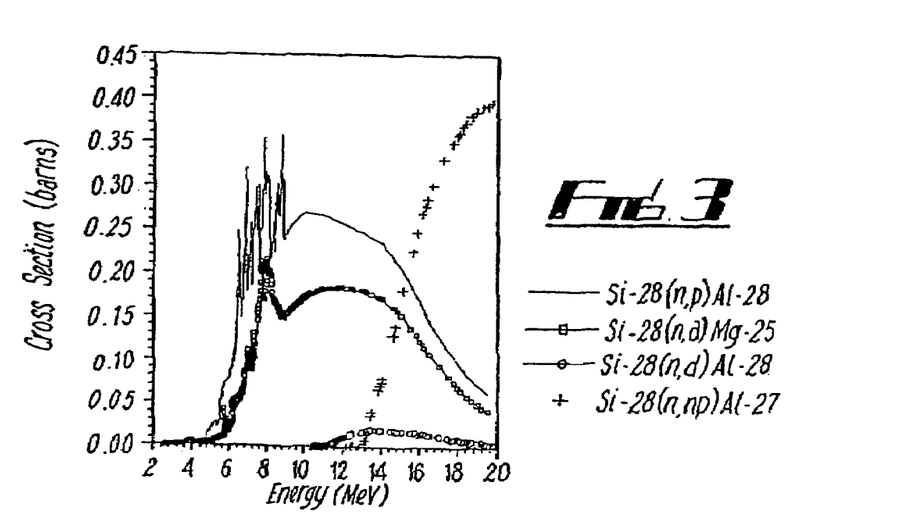
FIG. 3 shows reaction cross section as a function of neutron energy for $^{28}$Si(n,p)$^{28}$Al, $^{28}$Si(n,α)$^{25}$Mg, $^{28}$Si(n,d)$^{27}$Al and $^{28}$Si(n,np)$^{27}$Al conversion reactions in a hypothetical silicon based MCP detector.

FIG. 3 shows cross sections for the $^{28}$Si(n,p)$^{28}$Al, $^{28}$Si(n,α)$^{25}$Mg, $^{28}$Si(n,d)$^{27}$Al and $^{28}$Si(n,np)$^{27}$Al reactions as a function of neutron energy. At neutron energies between 5 and 10 MeV, the first two of these reactions are exploited. The highest combined cross section is observed at ca. 8 MeV. The (n,d) reaction only becomes effective at energies above ca. 10 MeV, and the (n,np) reaction only becomes effective above ca. 12 MeV. The energy thresholds in the cross sections of these reactions indicate that an appropriate MCP detector would provide the neutron energy discrimination necessary to reduce the effect of low energy neutron scatter on the detectability of small features in fast neutron radiography applications. Reduced neutron scattering results in improved image contrast and resolution.

It should be noted that the $^{28}$Si(n,p)$^{28}$Al, $^{28}$Si(n,α)$^{25}$Mg, $^{28}$Si(n,np)$^{27}$Al and $^{28}$Si(n,d)$^{27}$Al conversion reactions are not the only reactions contributing to the neutron reactions of the lead silicate MCP glass. There will also be (n,p) and (n,α) reactions with the alkali metal constituents of the glass, minor neutron reactions with the Pb and O nuclei present in the glass, with thresholds in these cases being above 2.5 MeV, and with $^{39}$K which has a cross section of 0.2 barns above 1 MeV. These reactions further contribute to the neutron detection ability of MCPs in standard lead glass MCPs.

Figure 4:
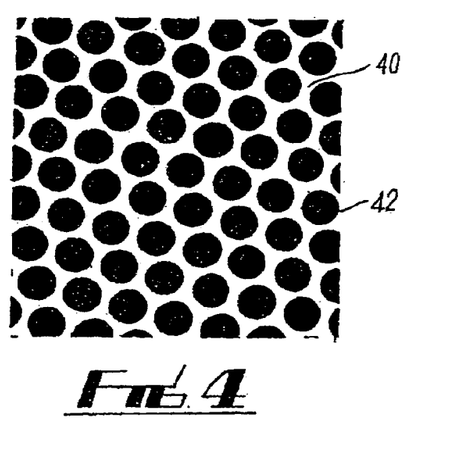
FIG. 4 shows a conventional alkali lead silicate glass MCP structure with 5 μm round pores.

FIG. 4 shows the structure of a typical MCP detector used in X-ray applications. The structure comprises a wall structure 40 which defines a "honeycomb" of microchannels 42. The structure of the MCP and nature of the reaction imply that the signal from the neutron detection process will be confined to the channels of the MCP; therefore, the intrinsic resolution of the converter screen is limited by the dimensions of the MCP channels. An industry standard for glass MCP structures comprises a 15 µm channel pitch and 12 µm channel diameter. Therefore, the channel wall thickness is of the order of a few microns. The thickness of these plates is of the order of a few millimetres. The maximum etchable thickness of glass is of the order of 10 mm. In current lead silicate glass MCPs, the silicon content is typically ca. 18%

Si by weight in $SiO_2$. It is likely that, in order to detect fast neutrons with good sensitivity, the silicon content of the MCP is improved somewhat in comparison to conventional lead silicate glass MCPs of the type described above. There are a number of ways in which this can be accomplished: these strategies are discussed below.

In one strategy the proportion by weight of the MCP which is comprised of Si is increased with respect to conventional lead silicate glass MCPs. It is believed that increases of up to 50% Si in $SiO_2$ can be obtained readily. Furthermore, "all silicon" MCP devices are under development (by NOVA Scientific Inc., Sturbridge, Mass., USA and Nanosciences Corp., Oxford, Conn., USA). Such devices, and methods for manufacturing same, are disclosed in U.S. Pat. No. 5,997,713, U.S. Pat. No. 6,045,677, U.S. Pat. No. 6,384,519 and O. H. W. Siegmund, A. S. Tremsin, J. V. Vallerga, C. P. Beetz, R. W. Boerstler, J. Yang and D. Winn, in X-Ray and Gamma-Ray Instrumentation for Astronomy XII, Proceedings of SPIE, 4497 (2002) 139, the contents of all of which are herein incorporated by reference.

In another strategy, the thickness of the MCP is enhanced. The thickness of the walls of the MCP and/or the thickness of the MCP itself might be increased. One way in which overall thickness might be increased is to use a stacking of two or more individual MCPs to provide a thick stacked structure. As noted previously, the use of a plurality of MCPs to form the front face of the detector is within the scope of the invention. It is possible to combine these two approaches by utilising a three dimensional array of MCPs, ie, a configuration in which stacking of MCPs is used to increase the detector thickness and to increase the area of the front face of the detector.

Since there is no light conversion step and neutron scattering is not an issue, the thickness of the detectors are limited only by the concentration of silicon and the linear attenuation coefficient of the material used in the MCP. It is possible to increase the channel diameter to facilitate the channel etching process as an alternative to standard MCP manufacturing techniques. The ratio of the channel wall thickness to the channel diameter depends strongly on manufacturing limitations. It should be noted in this regard that in the case of an amorphous silicon or selenium photodiode array, the intrinsic resolution of the detector would be limited by the pixel size of this array (~100 µm). Thus, it is possible to utilise a MCP channel diameter which is of the order of the dimensions of a readout pixel without affecting the spatial resolution of the device. The use of larger channel diameters may facilitate the manufacturing process.

The development of a fast neutron microchannel place (MCP) imaging detector with an electron gain of $\sim 10^4$ (which is desirable), and an amphorous silicon (a-Si) pixel array readout requires that the MCP operates in a pressure environment of ca. $1 \times 10^{-5}$ bar to $1.0 \times 10^{-7}$ bar, since several kilovolts are applied to the MCP electrodes in order to produce an electric field across the detector capable of providing the desired electron gain. An appropriate vacuum vessel is required to achieve these operating pressures with both the MCP and a-Si pixel array operating within the vacuum. As a result of this constraint, a suitable electronics interface is required to carry the clocking signal into the vacuum and carry the output signal out of the vacuum to the appropriate signal gain and analogue-to-digital conversion electronics.

The first embodiment of the invention, shown in FIG. 1, provides one way in which this can be achieved by way of providing a vacuum seal on the electron detector itself. A second embodiment of the invention, in which an alternative approach is employed, will now be described with reference to FIGS. 11 to 15. The second embodiment as described below utilises an amphorous silicon detector, although the skilled reader will appreciate that other types of electron detector might be utilised.

An exemplary a-Si detector array consists of 512×512, 127 µm pixels and the sensitive area, including the glass substrate (~1 mm thick), covers a total area of ~46.2 $cm^2$. The surface of the array has exposed metal pads, about 100 nm thick, on top of a passivation layer. The clock driver electronics and the readout electronics are on two sides of the array. Vertical and horizontal pads link the rows and columns of the array to the associated electronics, and these pads have a 100 µm pitch, with each pad 50 µm in width and separated from the adjacent pad by a 50 µm gap.

Figure 11:
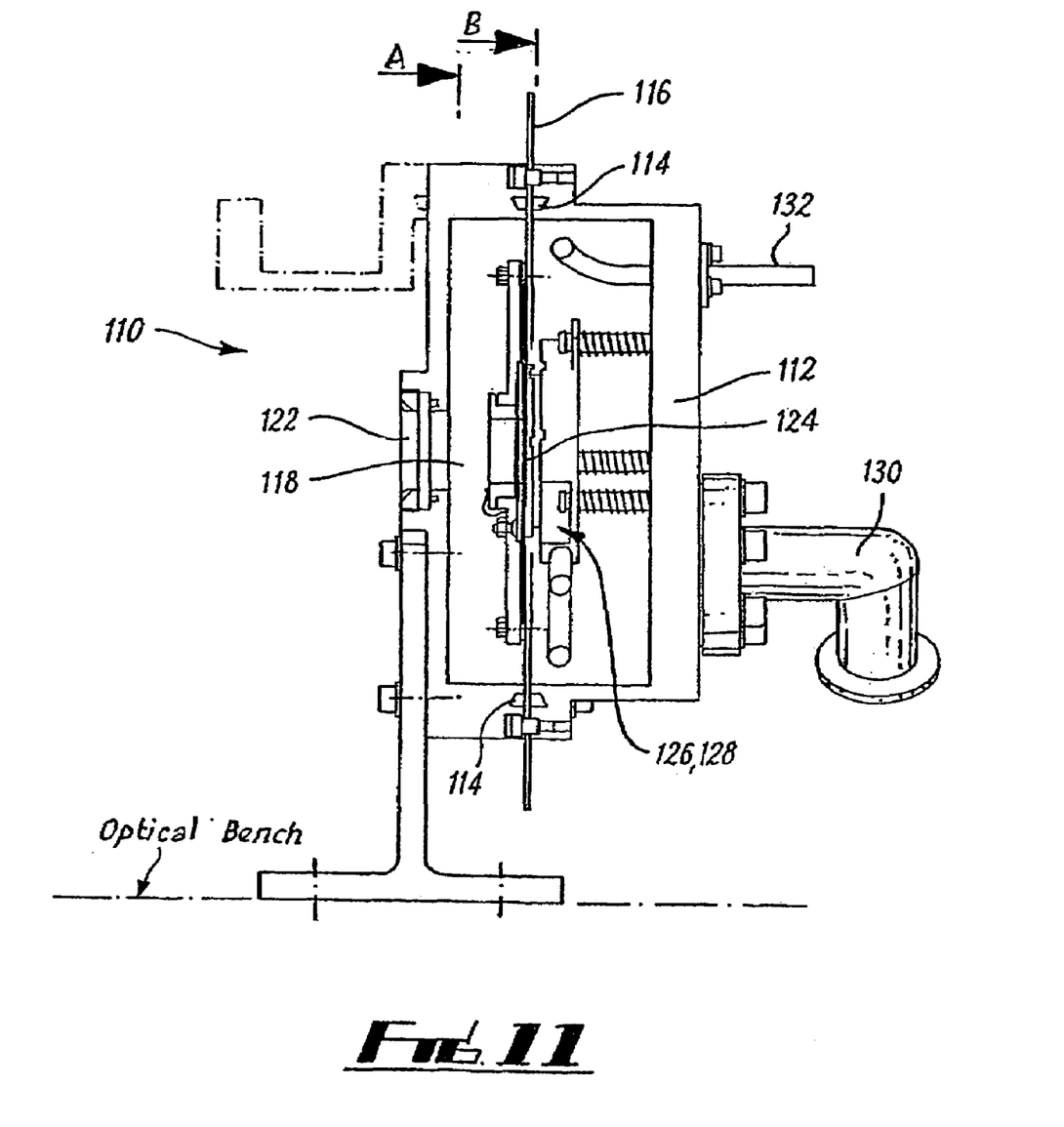
FIG. 11 shows a second embodiment of the invention.

FIG. 11 shows a device 110 of the second embodiment, which comprises a vacuum vessel 112 of a suitable material, such as aluminium, separated into two main sections: A and B. O-ring seals 114 in both sections of the vessel form the vacuum seal with a printed circuit board (PCB) 116 which in turn acts as the interface between the MCP detector assembly 118 and the electronics (not shown) disposed outside of the vacuum.

Section A might be fixed to an optical bench or adapted to fit onto an accelerator beam line. A window 122 is removable and its composition can be specified to be transparent to UV light, neutrons or X-rays. Its thickness should withstand a pressure differential of 1 bar. For tests with neutrons an aluminium disc can be used.

Section B houses the MCP assembly 118 with a-Si array 124 bonded to the PCB 116. The PCB 116 is attached to Section B of the vacuum vessel, and any changes in the shape of the o-ring, when the seal is broken, will be taken up by screws that keep the PCB 116 and the detector assembly 118 in place. This will prevent any flexing of the PCB 116 and detector assembly 118 from occurring. An optional thermoelectric cooler 126 and spring mounted cold finger 128 are shown. On the external part of Section B a pumping port 130 and coolant pipes 132 are shown.

Figure 12:
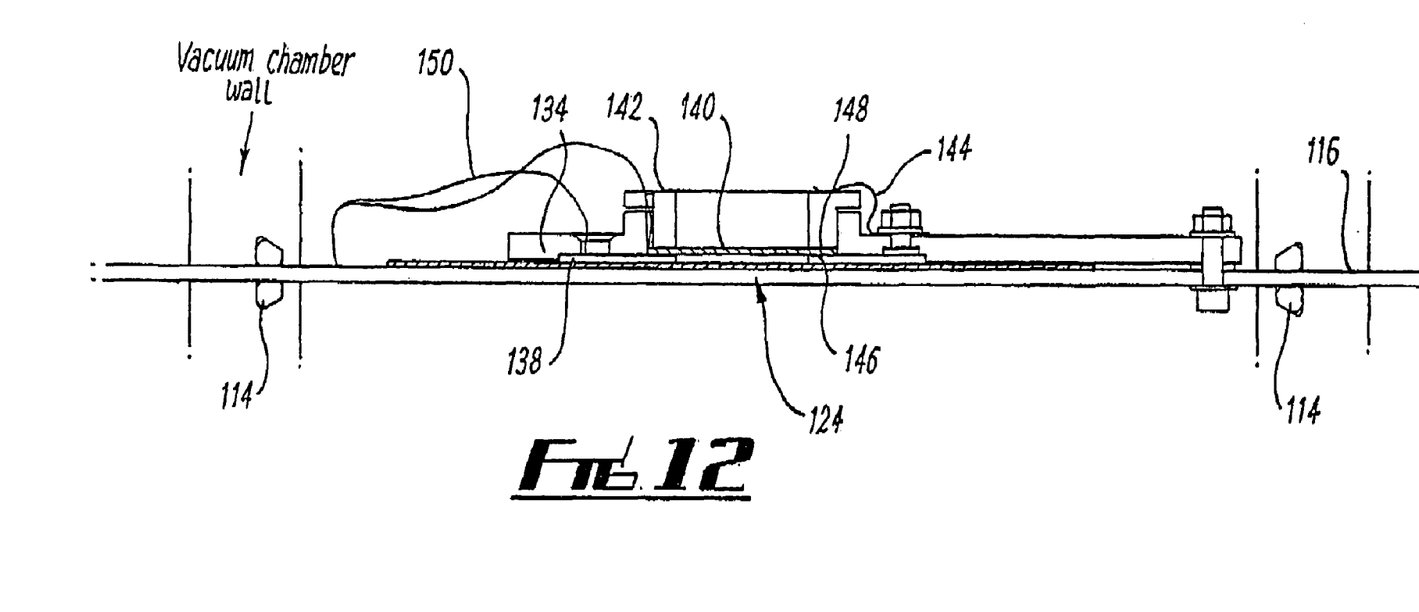
FIG. 12 is a cross sectional view through the vacuum housing of the second embodiment.
Figure 13:
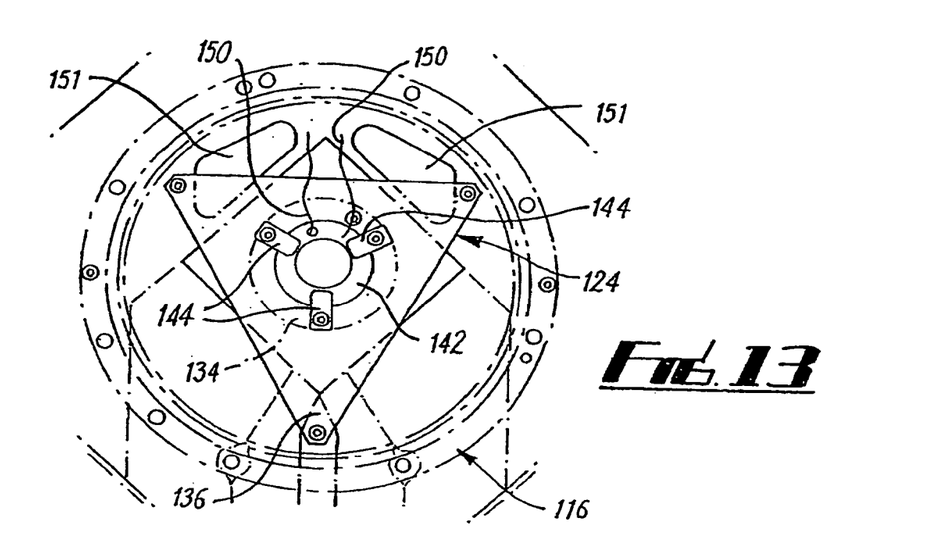
FIG. 13 is a plan view of a MCP holder mounted on a PCB.

The MCP detector assembly 118 comprises a MCP holder 134. An enlarged cross-sectional view of the MCP holder 134 is shown in more detail in FIG. 12, whilst FIG. 13 shows a plan view of the holder as would be seen through section A of the vacuum seal. Common numerals are used to denote features which are shared with FIG. 11 and features which are shared between FIGS. 12 and 13. FIG. 13 shows that the MCP holder 134, which is preferably a ceramic, is attached to the PCB 116 via three mounting points 136. The holder 134 rests on the surface of the a-Si array 124 and a spacer 138 ensures that the MCP 140 is at a suitable separation from the surface of the pixel array 124, a typical spacing being 1 mm. A MCP retaining ring 142 is clamped to the main structure of the MCP holder 134 via three clamping springs 144. The top surface 146 of the spacer and the bottom surface 148 of the clamping ring are metallised in order to make contact with the electrodes of the MCP 140. Wire connections 150 to these metallised surfaces 146, 148 exit the vacuum chamber-through the PCB 116. The PCB 116 is perforated to facilitate the evacuation of the chamber, such as through orifices 151.

A series of damage tests were carried out to determine the robustness of the detector array surface. The device depicted in FIGS. 11 to 13 has the MCP holder resting on the surface of the a-Si detector array. In order to determine whether there is any potential for mechanical damage to the surface of the array, a ceramic slab approximately ~3 mm thick was placed on top of a non-functioning a-Si array and a moderate amount of force was applied to the ceramic with an index finger. The test array was examined under a microscope to determine if any damage was visible, and it was ascertained that the resting of the ceramic slab on the surface of the array caused no visible damage.

In a second test the ceramic structure was vigorously rubbed across the same region of the array whilst applying the same amount of pressure to the surface. This caused some visible damage to the array.

In a third test the surface of the a-Si detector array was scratched with the edge of the ceramic slab, this action producing more significant mechanical damage of the surface of the a-Si array.

These tests reveal that resting the ceramic holder on the surface will not damage the array as long as there is no translational movement of the holder across the surface of the array. It may be prudent to round off the edges of the holder in order to prevent any accidental scratching of the surface of the pixel array.

The tests demonstrate the robustness of the array to incidental damage. In any event a field maintainable interface between these components might be employed which would eliminate any such risk.

Figure 14:
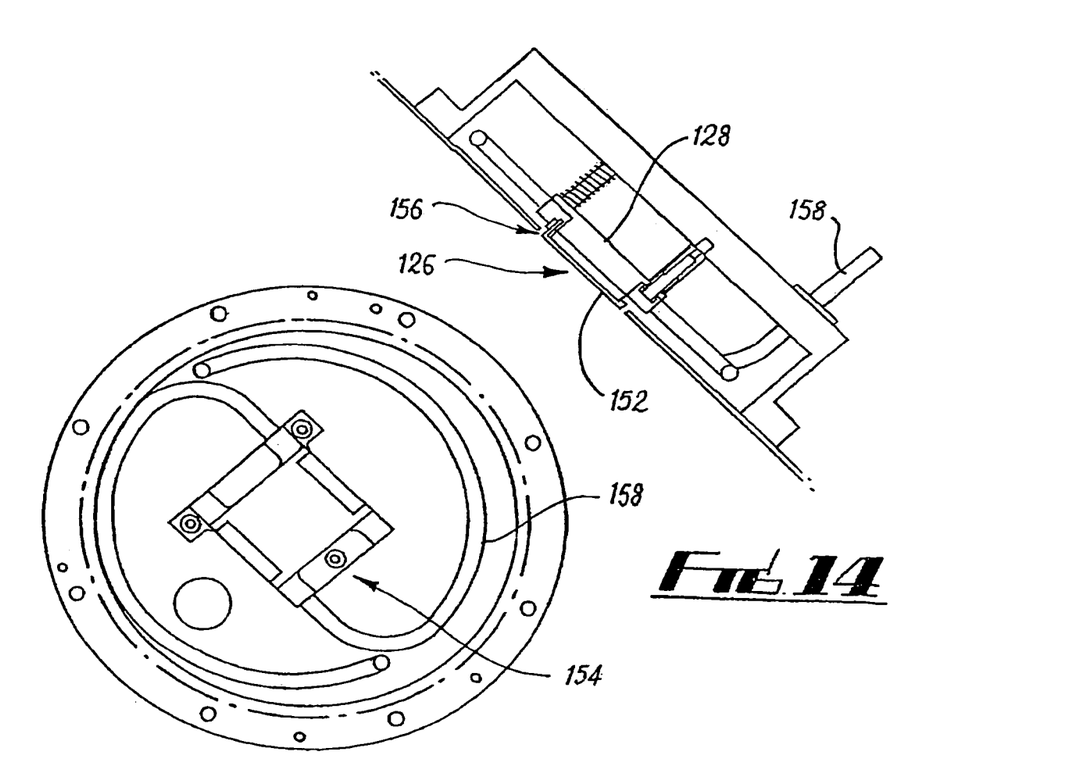
FIG. 14 shows a cooling arrangement.

Optionally, a thermoelectric cooler (TEC) might be incorporated. Cooling the array allows a suppression of the dark current for tests requiring long image intergration times. Although this may not be required for imaging with a MCP detector as a result of the gain associated with it, it may be useful in other applications, such as when a study is carried out comparing different scintillator-based neutron detectors with the results obtained with the MCP. FIG. 14 shows one way in which a thermoelectric cooler 126 could be mounted on a spring-loaded heat exchanger 154, which configuration would allow the TEC 126 to be placed in close contact with the substrate of the a-Si array, without placing any stress on the detector assembly. This heat exchanger design would facilitate the assembly of the two halves of the vacuum vessel (specifically the compression of the o-ring) without placing undue stress on the detector assembly. To monitor the temperature of the cold side of the TEC 126 an "L" shaped thin metal sheet 152 is placed between the cold side of the TEC 126 and the a-Si substrate; a small platinum resistance thermometer 156 can be attached to the metal sheet 152. Coolant pipes 158 are provided. The a-Si array would only be cooled to a minimum temperature of −10° C. without affecting the performance of the transistors. This option is a preferred one until such time as the necessity for cooling has been reliably eliminated. Suitable thermoelectric coolers include single stage coolers manufactured under the trade name UltraTEC (RTM) by Melcor Corp, Trenton, N.J., USA.

In the device of the second embodiment TAB (tape automated bonding) electronics connections are made to two edges of the array. The contacts for these parts have a 100 μm pitch and there are 128 lines (plus a few extra for alignment), with four groups of contacts on each side. Currently, TAB chips—the gate driver shift register and the data charge sensitive amplifiers—only come in TAB form. Designs such as that shown in FIG. 15 can be employed to ensure that the fundamental requirements that the PCB board 116 have contacts of the correct dimension, which are in the correct position (as shown on the array) and are TAB-bonding compatible are met. As noted previously, the PCB connected to the a-Si array (or other suitable electron detector) can act as the vacuum interface to the detector. Tracks can lead from the detector to equivalent points outside of the vacuum which are compatible with TAB bonding to the electronics.

Figure 15:
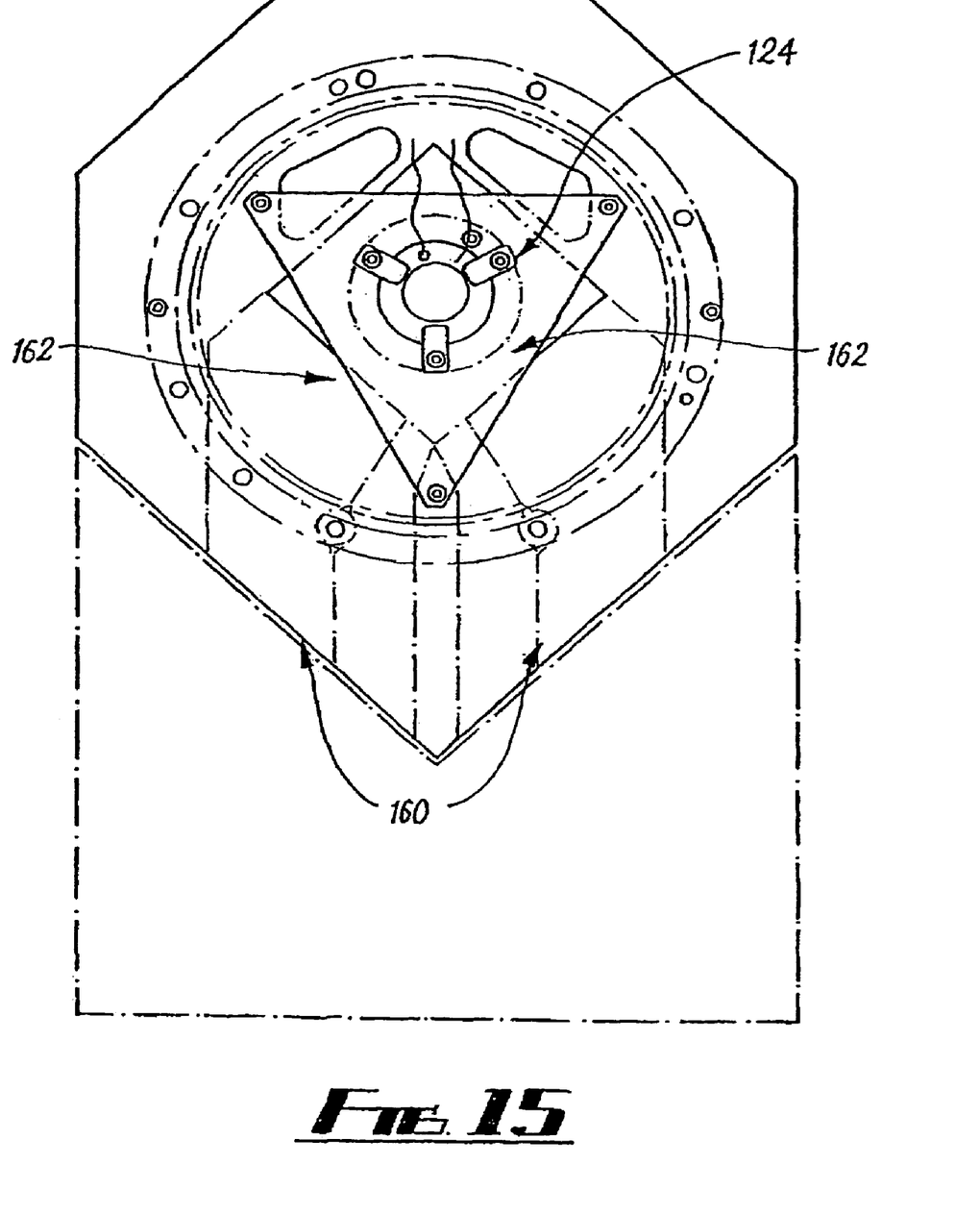
FIG. 15 shows an electronics interface to an amorphous silicon array.

FIG. 15 shows the a-Si array 124 bonded to the PCB 116. 512×512 wire bond connections 162 are made to TAB pads on the array 124. The wire bond connections 162 are supported by and attached to the wall of the vacuum vessel 112. In exemplar embodiments, the distance between the connected edges of the array and the TAB edges of the PCB 116 is 70 mm. This should not pose a problem for wire-bonding machines, which require that the distance be kept to less than 130 mm. The connections lead through the wall of the vacuum vessel 112 to the same number of TAB pads 160 in the same configuration as on the array. Additional tracks for alignment can also be included. A support structure for the electronics external to the vacuum could be attached to the underside of the PCB if required.

Figure 16:
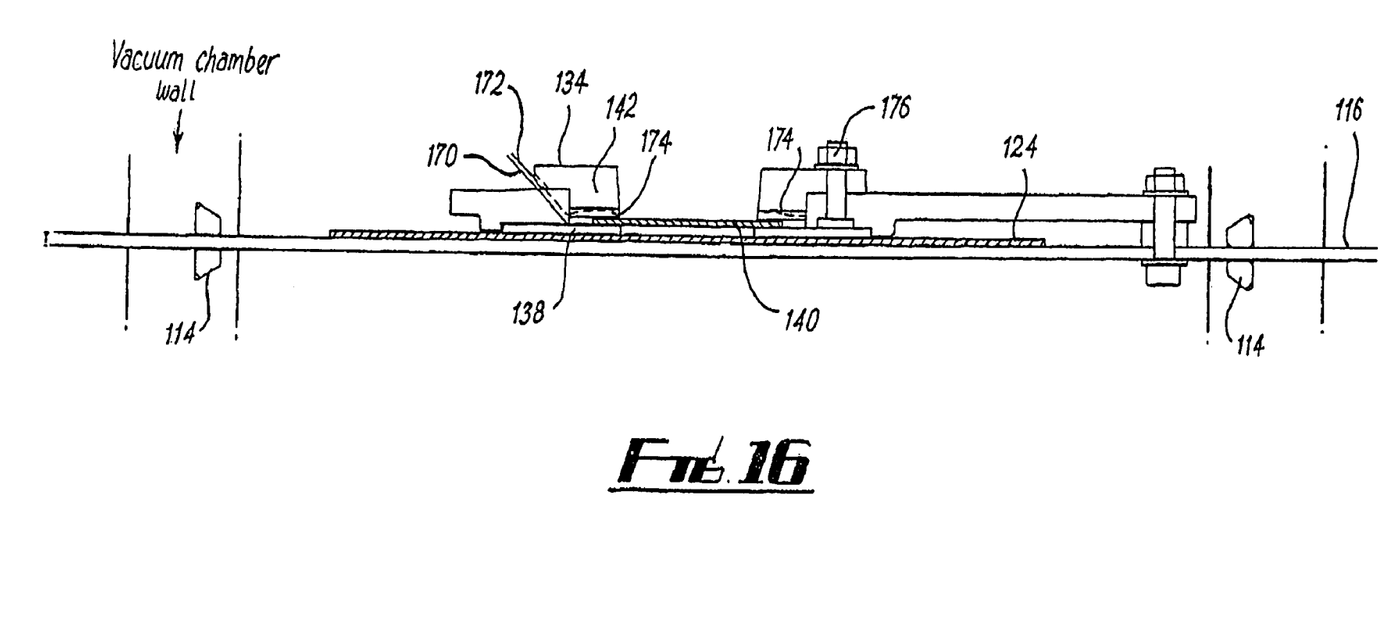
FIG. 16 is a cross sectional view through a vacuum housing of a third embodiment.

FIG. 16 shows a cross sectional view through a vacuum housing of a third embodiment of the invention. The third embodiment shares a number of features with the second embodiment, and identical numerals to those used in FIGS. 11 and 12 are employed in FIG. 16 to denote such shared features. In FIG. 16, a lower electrode 170 and an upper electrode 172 make electrical contact with the faces of the MCP 140, the electrodes 170, 172 being held in place by contact springs 174. The electrodes protrude from the MCP holder 134. The retaining ring 142 is maintained in place with a number of nuts and bolts 176.

EXAMPLE 1

Detector efficiency was modelled as a function of detector composition and thickness using Monte Carlo techniques.

Four MCP compositions were investigated:
1. standard MCP glass containing ~20% silicon by weight.
2. silicon dioxide MCP composed of 45% silicon.
3. all silicon MCP with 90% silicon.
4. 90% silicon MCP with 5% additional hydrogen.

In the first case, the primary component of the MCP glass was lead (50%) with additional components being oxygen (25%) and potassium (5%). All reactions between neutrons and the components of the MCP were considered including reactions producing gamma rays. The products of these reactions were examined to determine how the gamma ray background would interfere with the primary neutron detection process of the silicon components of the MCP glass.

In the second and third cases the only reactions considered were those with the silicon component of the MCP glass.

In the last case the hydrogen was added in order to determine how a small quantity of hydrogen would improve the neutron detection efficiency by exploiting the proton recoil reaction that is used in common fast neutron scintillating converter screens.

Modelling the MCP Structure

Figure 5:
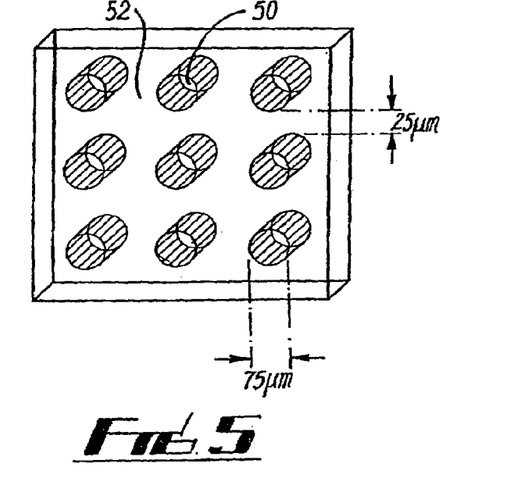
FIG. 5 is a schematic diagram of a MCNP model used in Example 1.

The first part of the model was based on the assumption that if each element of the a-Si array is approximately 100 μm×100 μm in area and there is one MCP channel for each a-Si pixel, then each channel could have a 75 μm diameter and a 25 μm total wall thickness. The hypothetical MCNP geometry used in this part of the study is depicted in FIG. 5. In this model the MCP channels 50 were assumed to be cylindrical; however, MCPs with channels of a different shape, such as square or hexagonal, could also be considered. The channel wall 52 thickness to diameter ratio could also be varied in order to further optimise the MCP configuration.

Modelling the Point Scattering Function of the Detector Material

The second part of the model required exploring the point scattering function for the materials in question. This technique was used to determine how the threshold in the silicon-based reaction used to detect the neutrons reduces the neutron scatter component in the detector. This affects the detectability of the feature of interest in a radiograph.

The point scattering function for the converter screen material was evaluated using a cylindrical geometry. A line source of neutrons was directed down the axis of a hypothetical, silicon-based cylinder and the tallies were collected in a series of annular concentric volumes with a varying pitch ranging from 0.0125 mm, close to the centre of the converter screen, to 20 mm close to the edge of the converter screen. On this basis, a point scattering function was evaluated. This is the point scattering function for the detector and not, as is more usual, for the specimen. The Monte Carlo code MCNP-X was used to determine the number of neutron interactions with the silicon component of the MCP glass as a function of Si concentration, converter screen thickness and neutron energy.

Results of the Computational Model

Detector Efficiency

Figure 6:
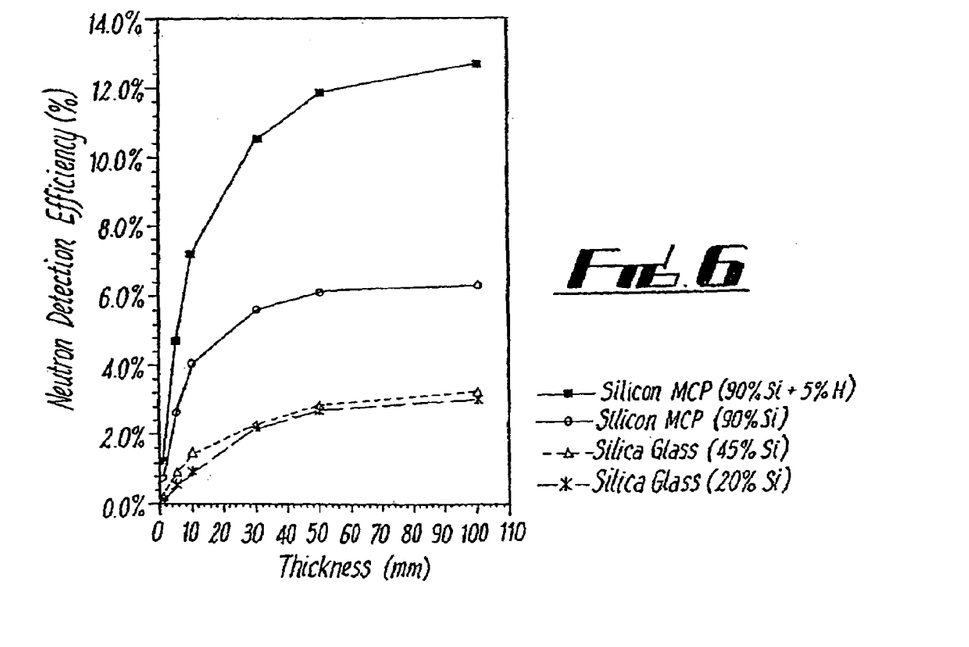
FIG. 6 shows neutron detection efficiency as a function of MCP thickness and composition.

The neutron detection efficiency of the MCP converter screens were evaluated as a function of composition and thickness. The results of the MCNP model are shown in FIG. 6. From the results it can be seen that increasing the Si concentration increases the overall efficiency of the detector. From the results it is also evident that increasing the MCP thickness beyond 30 mm does not increase the efficiency significantly. The addition of small quantities of hydrogen also has the effect of increasing the overall efficiency by exploiting both the proton recoil reaction and the reactions with the silicon component.

Neutron Scatter

Figure 7:
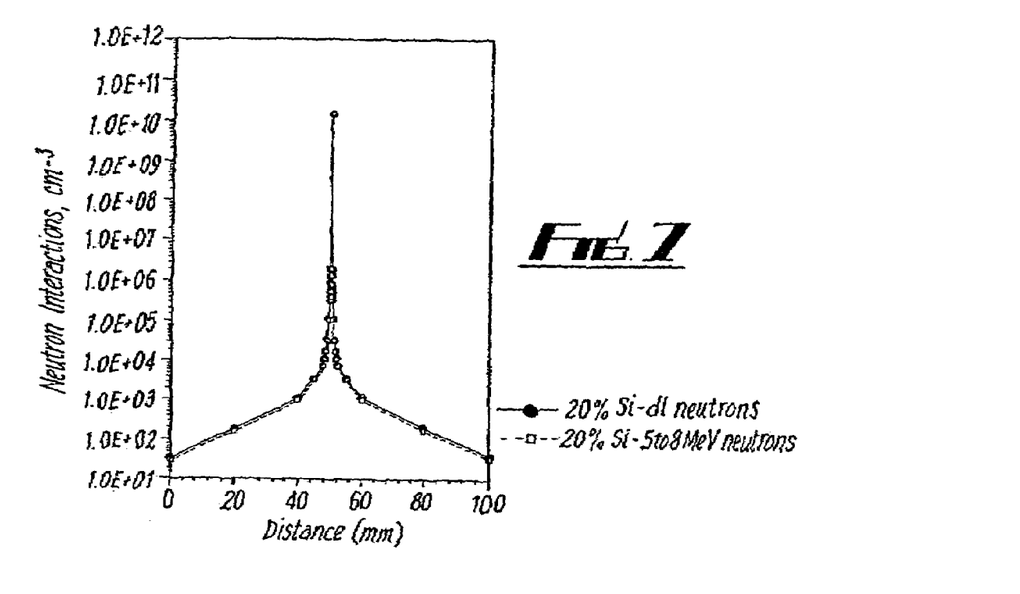
FIG. 7 shows the point scattering function for a 10 mm thick MCP composed of standard MCP glass and containing 20% Si.
Figure 8:
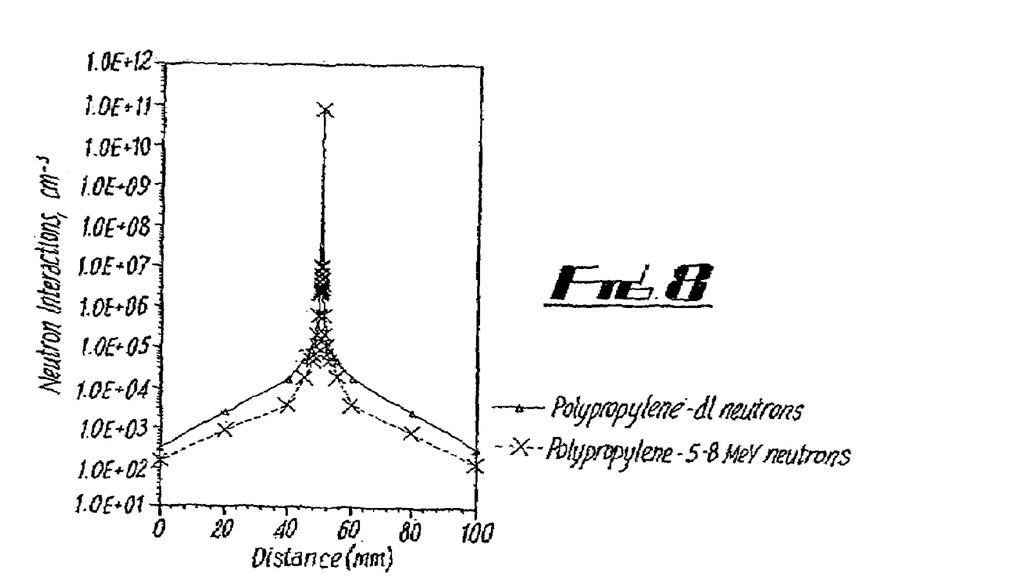
FIG. 8 shows the point scattering function for a 10 mm thick polypropylene radiator.
Figure 9:
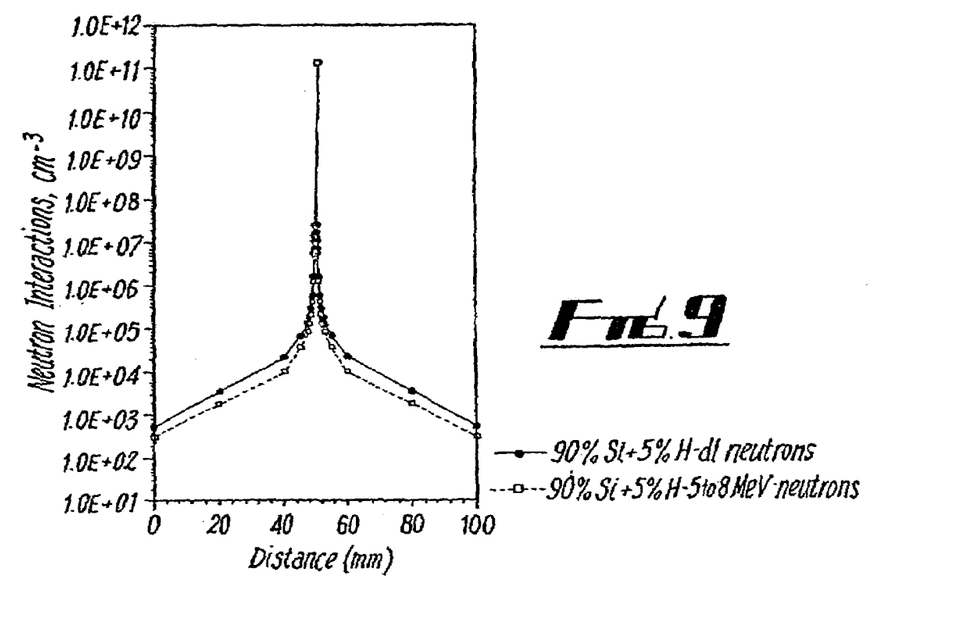
FIG. 9 shows the point scattering function for a 10 mm thick MCP composed of 90% Si and 5% H.

The point scattering function method described previously was used to determine how the threshold in the silicon reaction results in a reduction in the low energy scatter component associated with plastic scintillators. The results of the point-scattering function model are shown in FIG. 7. A direct comparison between these results and those associated with plastic scintillators can be made by examining the differences between FIGS. 7 and 8. FIG. 8 depicts the result obtained by repeating the Monte Carlo simulation by substituting the MCP material with a plastic radiator associated with fast neutron scintillators. FIG. 9 highlights the effect that the addition of small quantities of hydrogen has on the scattered low energy background.

Background

Figure 10:
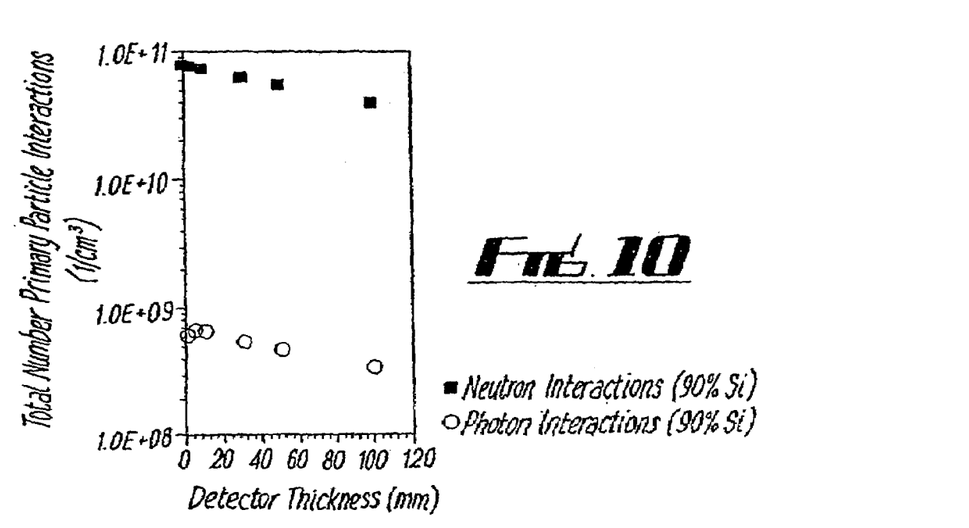
FIG. 10 shows background generated by photons in comparison to the primary neutron signal.

A comparison was made between the number of primary neutron interactions in the MCP and the number of photons produced by these neutrons interacting with the MCP structure. As evidenced in FIG. 10, in all cases the photon interactions were at least two orders of magnitude lower than the primary neutron interactions.

EXAMPLE 2

A series of calculations were performed to estimate the signal to noise values associated with the MCP a-Si detector combination for a typical 8 MeV neutron flux from an accelerator based source. The accelerator based neutron source comprised a 5 MeV, 20 μA, deuteron beam interacting with a deuterium gas target at atmospheric pressure. The neutron flux at the detector (situated at ~30 cm from the deuterium gas cell) was calculated to be $1\times10^7$ neutrons $cm^{-2}$ $s^{-1}$. The a-Si detector pixel size was 127 μm×127 μm. Thus the neutron flux was $1.6\times10^3$ neutrons $pixel^{-1}s^{-1}$ or $1.0\times10^3$ neutrons $s^{-1}$ over a 100 μm×100 μm area of the MCP structure used in this model. If the scintillating converter screen was replaced with a 30 mm or 50 mm thick MCP, the neutron detection efficiency would vary between 2% and 12% depending on the silicon and hydrogen concentration. If the assumption is made that one detected neutron produces at least one electron at the channel wall, the total number of electrons collected by the a-Si diode can be evaluated. Although the sensitive area of each 127 μm×127 μm pixel covers only 56% of the pixel (~71 μm) and each channel in the MCP model has a diameter of 75 μm. Therefore, this specific model one channel per pixel is a fair assumption. Since the total rms noise associated with a-Si pixel arrays is currently ~800 electrons rms, the signal to noise ratio (S/N) per detector pixel can be estimated for an average MCP gain per channel. Neutrons can interact anywhere within the MCP structure. Those electrons produced near the MCP front face would benefit from the maximum gain voltage between the MCP and the a-Si array. Conversely, electrons provided from interactions close to the back end of the MCP would result in a minimum gain. If the maximum gain were of the order of $10^4$ volts, a simple Monte Carlo sampling method can be used to determine what the average signal in electrons per pixel will be. For neutrons interacting in the bulk of the MCP material the interaction probability density function (pdf) is given by $$pdf(x) = \mu \exp(-\mu x)$$

where x is the interaction depth in the detector and μ the linear attenuation coefficient of the material. The cumulative probability distribution function (cpdf) is given by:

$$cpdf = 1 - \exp(-\mu x) \quad (1)$$

If it is assumed that one electron reaches the MCP channel wall per interacting neutron then for a given MCP peak gain (~$10^4$) the signal reaching the pixel of the a-Si array can be evaluated by sampling equation (1) and multiplying by a corresponding gain value. This method can be used to generate a sample of signal values and the average signal as a function of the MCP detector thickness and silicon content can be evaluated. Tables 1 and 2 summarise the results of these calculations for both 30 mm and 50 mm thick MCP converters.

TABLE 1

Estimated S/N for a 30 mm thick MCP structure.

| Silicon Content | Neutron Detection Efficiency | Detected Neutrons/pixel[a] | Average Signal Electrons/pixel[b] | S/N[c] |
|---|---|---|---|---|
| 20% (Si) | 2.2% | 22 | $1.6 \times 10^4 \pm 3.2\%$ | 20 |
| 45% (Si) | 2.3% | 23 | $4.4 \times 10^4 \pm 2.5\%$ | 55 |
| 90% (Si) | 5.6% | 56 | $8.5 \times 10^4 \pm 3.0\%$ | 106 |
| 90% (Si) + 5% (H) | 10.6% | 106 | $1.0 \times 10^5 \pm 2.9\%$ | 130 |

[a]Given a flux of $1.0 \times 10^3$ neutrons $s^{-1}$ over a 100 μm × 100 μm area of the MCP.
[b]Evaluated by Monte Carlo sampling methods.
[c]Given a 800 electron $pixel^{-1}$ rms noise level.

TABLE 2

Estimated S/N for a 50 mm thick MCP structure.

| Silicon Content | Neutron Detection Efficiency | Detected Neutrons/ pixel[a] | Average Signal Electrons/pixel[b] | S/N[c] |
|---|---|---|---|---|
| 20% (Si) | 2.7% | 27 | $3.1 \times 10^4 \pm 2.5\%$ | 3.4 |
| 45% (Si) | 2.9% | 29 | $6.8 \times 10^4 \pm 3.3\%$ | 3.6 |
| 90% (Si) | 6.1% | 61 | $1.4 \times 10^5 \pm 2.8\%$ | 7.6 |
| 90% (Si) + 5%(H) | 11.9% | 119 | $1.8 \times 10^5 \pm 2.7\%$ | 14.9 |

[a]Given a flux of $1.0 \times 10^3$ neutrons over a 100 μm × 100 μm area of the MCP.
[b]Evaluated by Monte Carlo sampling method.
[c]Given a 800 electron pixel$^{-1}$ rms noise level.

The signal to noise values shown above can be placed in context if compared to previous studies involving scintillating converter screens and both a-Si and CCD based detectors. In the study by Ambrosi et al, ibid the signal to noise obtained with a 2 mm thick PP converter and an a-Si detector array was ~1.35 given 4000 electrons rms in total readout noise. Given the current noise levels associated with a-Si pixel arrays, ~800 electrons rms, the S/N would improve to a maximum value of 5.4; however, the problems associated with the low energy scattered neutron component and reduced spatial resolution caused by light scatter or spreading (in the case of thicker scintillators) remain. Image resolution values obtained with the a-Si/PP converter detector combination were of the order of a few millimetres. The MCP a-Si detector combination described in this Example would have an intrinsic resolution limited by the a-Si pixel size (~100 μm).

Signal to noise values associated with the intensified CCD based detector system were higher, at least an order of magnitude higher than the values quoted in Tables 1 and 2. However, in comparison to the present invention, this detector has a number of problems associated with scintillator based detection methods and the limits imposed by the sized of CCDs. Imaging an area of approximately 11 cm×17 cm with a CCD approximately 1.3 cm×0.8 cm in size produced resolution values of at best 2 mm with the PP converter. This is to be contrasted with the ~100 μm resolution associated with the MCP/a-Si combination of this Example.

It will be apparent to the skilled reader that numerous modifications to the invention might be contemplated. For example, whilst fast neutron applications represent preferred aspects of the present invention, other forms of radiation, such as X-rays, might be detected and imaged. Thermal neutrons might be imaged, in which instance a boron enriched MCP of the type previously described might be coupled to a suitable electron detector, such as an a-Si detector, without an intermediate scintillator layer.

The invention claimed is:

1. A method of detecting fast neutrons of energy greater than 5 MeV comprising the steps of:
   providing a neutron detector comprising a plate having a plurality of detection sites disposed thereon which produce an electron output;
   directly coupling said neutron detector to an electron detector without an intermediate scintillator layer;
   positioning the neutron detector so that neutrons are incident on said neutron detector; and,
   detecting the output of the electron detector.

2. A method according to claim 1 wherein the neutron detector is a microchannel plate, having a plurality of microchannel detection sites.

3. A method according to claim 1 wherein the neutron detector is a microsphere or microfibre plate.

4. A method according to claim 1 wherein in which the area of the neutron detector upon which the detected neutrons are incident is greater than $1.0 \times 10^{-2}$ m$^2$, preferably greater than $5.0 \times 10^{-2}$ m$^2$, more preferably greater than $5.0 \times 101$ m$^2$, most preferably greater than $6.0 \times 10^{-1}$ m$^2$.

5. A method according to claim 1 wherein the electron detector is without an entrance window, thereby permitting direct accumulation of electron charge from the neutron detector on the electron detector.

6. A method according to claim 1 wherein the electron detector comprises a pixel array detector.

7. A method according to claim 6 wherein the electron detector comprises an amorphous silicon or an amorphous selenium pixel array detector.

8. A method according to claim 1 wherein the neutron detector comprises greater than 45% by weight of silicon, preferably greater than 90%.

9. A method of detecting and imaging neutrons according to claim 1 wherein the step of detecting the output of the electron detector comprises assembling outputs from different discrete areas of the electron detector in order to produce an image of neutrons incident on the neutron detector.

10. A method according to claim 1 wherein the neutron detector comprises an array of individual plate devices.

11. A radiation detection device useful to image fast neutrons of energy greater than 5MeV comprising a neutron detector directly coupled to a pixel array electron detector, wherein the radiation detector comprises a plate having a plurality of detection sites disposed thereon which produce an electron output, and the radiation detector is directly coupled to the electron detector without an intermediate scintillator layer.

12. A device according to claim 11 wherein the radiation detector is a microchannel plate having a plurality of microchannel detection sites.

13. A device according to claim 11 wherein the radiation detector is a microsphere or microfibre plate.

14. A device according to any of claim 11 wherein the electron detector is an amorphous silicon or amorphous selenium pixel array detector.

15. A device according to claim 11 wherein the electron detector is without an entrance window thereby permitting direct accumulation of electron charge from the radiation detector on the electron detector.

16. A device according to claim 11 wherein the radiation detector has a front face upon which radiation is incident, and the surface area of said front face is greater than $1.0 \times 10^{-2}$ m$^2$, preferably greater than $5 \times 10^{-2}$ m$^2$, more preferably greater than $5.0 \times 10^{-1}$ m$^2$, most preferably greater than $6.0 \times 10^{-1}$ m$^2$.

17. A device according to claim 11 for imaging radiation such as neutrons and X-rays, the device further comprising imaging means for assembling outputs from different discrete areas of the electron detector in order to produce an image of radiation incident on said radiation detector.

18. A device for imaging of fast neutrons of energy greater than 5MeV, the device comprising a neutron detector directly coupled to an electron detector without an intermediate scintillator layer, the neutron detector comprising a plate having a plurality of detection sites disposed thereon which produce an electron output.

* * * * *